US008938449B1

(12) United States Patent
Duerig

(10) Patent No.: US 8,938,449 B1
(45) Date of Patent: *Jan. 20, 2015

(54) SEMANTIC IMAGE LABEL SYNTHESIS

(71) Applicant: Google Inc., Mountain View, CA (US)

(72) Inventor: Thomas J. Duerig, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,726

(22) Filed: May 3, 2013

Related U.S. Application Data

(63) Continuation of application No. 13/225,043, filed on Sep. 2, 2011, now Pat. No. 8,458,174.

(51) Int. Cl.
*G06F 17/30* (2006.01)

(52) U.S. Cl.
CPC ...... *G06F 17/3053* (2013.01); *G06F 17/30244* (2013.01); *Y10S 707/913* (2013.01); *Y10S 707/915* (2013.01); *Y10S 707/917* (2013.01); *Y10S 707/918* (2013.01)
USPC ........... 707/723; 707/913; 707/915; 707/917; 707/918

(58) Field of Classification Search
CPC ............ G06F 17/30047; G06F 17/241; G06F 17/30247; G06F 17/30244; G06F 17/3053
USPC .......................... 707/723, 913, 915, 917, 918
See application file for complete search history.

(56) References Cited

U.S. PATENT DOCUMENTS

| | | | |
|---|---|---|---|
| 7,257,774 B2* | 8/2007 | Denoue et al. ................ 715/719 |
| 7,529,411 B2 | 5/2009 | Haupt et al. | |
| 7,756,341 B2* | 7/2010 | Perronnin ...................... 382/224 |
| 7,890,512 B2* | 2/2011 | Mei et al. ....................... 707/737 |
| 8,156,116 B2* | 4/2012 | Graham et al. ............... 707/728 |
| 8,326,001 B2* | 12/2012 | Free ............................... 382/118 |
| 8,458,174 B1* | 6/2013 | Duerig .......................... 707/723 |
| 2004/0021685 A1* | 2/2004 | Denoue et al. ................ 345/721 |
| 2005/0181803 A1 | 8/2005 | Weaver et al. | |
| 2005/0207622 A1 | 9/2005 | Haupt et al. | |
| 2006/0237531 A1 | 10/2006 | Heffez et al. | |
| 2008/0288476 A1 | 11/2008 | Kim et al. | |
| 2009/0070415 A1 | 3/2009 | Kishi et al. | |
| 2009/0074261 A1 | 3/2009 | Haupt et al. | |
| 2009/0125510 A1 | 5/2009 | Graham et al. | |
| 2009/0235187 A1 | 9/2009 | Kim et al. | |
| 2011/0211746 A1* | 9/2011 | Tran .............................. 382/137 |
| 2012/0054658 A1* | 3/2012 | Chuat et al. .................... 715/771 |
| 2012/0072493 A1* | 3/2012 | Muriello et al. .............. 709/204 |

OTHER PUBLICATIONS

Kalogerakis et al. "Image Sequence Geolocation with Human Travel Priors," Proceedings for the IEEE International Conference on Computer Vision Recognition (ICCV), 2009, 8 pages.

* cited by examiner

*Primary Examiner* — Thanh-Ha Dang
(74) *Attorney, Agent, or Firm* — Fish & Richardson P.C.

(57) ABSTRACT

Methods, systems, and apparatus, including computer programs encoded on a computer storage medium, for adjusting confidence scores of image labels for images. In one aspect, a method includes accessing images stored in an image data store, the images being associated with respective sets of labels, the labels describing content depicted in the image and having a respective confidence score that is a measure of confidence that the label accurately describes the content depicted in the image; selecting a first image from the images and determining for each of the other images and independent of the labels, a proximity score that is a measure of a relatedness of the other image to the first image; and adjusting the set of labels associated with the first image based on the respective proximity scores of the other images and the confidence scores of the labels of the other images.

20 Claims, 5 Drawing Sheets

SEMANTIC IMAGE LABEL SYNTHESIS

CROSS-REFERENCE TO RELATED APPLICATION

This application is a continuation of, and claims priority to, U.S. patent application Ser. No. 13/225,043, entitled "Semantic Image Label Synthesis," and filed on Sep. 2, 2011, the entire disclosure of which is incorporated herein by reference.

BACKGROUND

This specification relates to image labeling.

The Internet provides access to a wide variety of resources, for example, video or audio files, web pages for particular subjects, book articles, and news articles. Users communicate across the internet using various forms of communication, such as electronic mail, discussion groups, blogs, and personal web pages.

A search system can identify resources in response to a text query that includes one or more search terms or phrases. The search system ranks the resources based on their relevance to the query and on measures of quality of the resources and provides search results that link to the identified resources. The search results are typically ordered for viewing according to the rank.

To search image resources, a search system can determine the relevance of an image to a query based on labels associated with an image. A label typically describes a category or topic for an image, or content depicted in an image, and is readable by a human or a computer (or both). The search system can rank images based on the relevance of the query to the various labels associated with the images, and produce image search results based on the rankings.

Labels associated with a particular image may be manually associated with the image by a user or automatically associated using computer vision techniques. In some cases, labels are created automatically for an image by a computer using computer vision techniques. However, manually associating labels with an image is time-consuming and rarely done in a consistent manner across different users. In addition, computer vision techniques are limited to what a computer can detect in an image, which may limit the accuracy of the labels.

SUMMARY

This specification describes technologies relating to image labeling.

In general, one innovative aspect of the subject matter described in this specification can be embodied in methods that include the actions of accessing images stored in an image data store, the images being associated with respective sets of labels, the labels describing content depicted in the image and having a respective confidence score that is a measure of confidence that the label accurately describes the content depicted in the image; selecting a first image from the images and determining for each of the other images and independent of the labels, a proximity score that is a measure of a relatedness of the other image to the first image; and adjusting the set of labels associated with the first image based on the respective proximity scores of the other images and the confidence scores of the labels of the other images. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter described in this specification may be used for improved image ranking in an image search, thereby improving accuracy and efficiency. The subject matter described in this specification may also take advantage of multiple signals (e.g., proximity metric values), and as such can scale as more signals become available. In some implementations, the subject matter described herein is implemented as a single-pass system, which has a lower maintenance burden than an iterative image label creation method.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For each image in a set of images, a set of labels, optionally preferably with a confidence score for each label, is associated with the image. A label is data that describes the content of an image, e.g., an item in the image, a context of the image, a topic to which the image relates, etc. A confidence score is a measure of confidence that the label accurately describes the content of the image. An image labeling system selects an image and creates a graph of other images that are proximate to the selected image in time, space, social-graph, photo album, etc., with weights appropriate to the proximity. The graph represents a measure of relatedness of the other images to the selected image as defined by one or more of the applicable weights. For example, a weight for geo-location can be determined using distance squared, a weight for social distance can be determined using communication frequency between users, etc. The image labeling system then uses a probabilistic combination technique to adjust the probability of some labels for the image, and outputs the final set of smeared labels.

For example, a single picture of a barbeque on a first user's album was taken at a second user's house and was appropriately labeled due to the canonical nature of the image (e.g., computer labeled due to the image of a charcoal grille). Other images taken at the same time and place in the first user's album with a very low confidence for the label "barbeque" then have their respective confidence scores for the label "barbeque" adjusted (e.g., to indicate a greater likelihood that those images are related to a barbeque) such that when searching for "barbeque" the second user receives pictures of the same event from the album of the first user.

Figure 1:
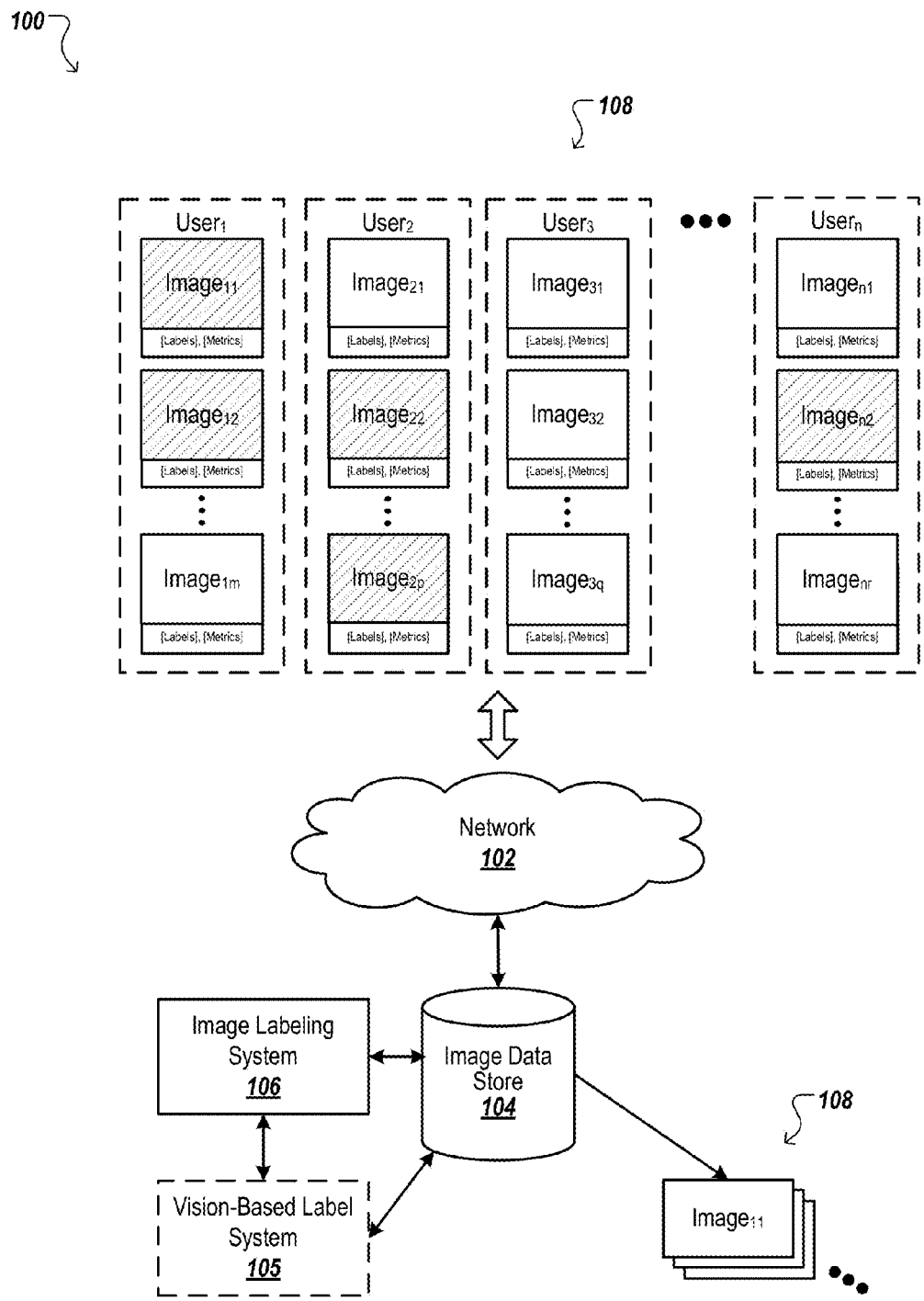
FIG. 1 is a block diagram of an example environment in which an image labeling system creates image labels.

FIG. 1 is a block diagram of an example environment 100 in which an image labeling system creates image labels. The example environment 100 includes a network 102, such as a local area network (LAN), a wide area network (WAN), the Internet, or a combination thereof. The example environment 100 also includes an image data store 104, an image labeling system 106, and images 108.

An image data store 104 stores images 108 which may be transmitted through the network 102. In some implementations, the images 108 are first communicated or transmitted across the network 102 to the image data store 104 by users. A user may be an individual, a corporation, or any other entity capable of transmitting, or causing transmission of, images 108 across the network 102.

In the example of a social network, users may access the network 102 in order to store images and/or share images 108 with other users. A user can share and/or store images 108 by transmitting them across the network 102 to the image data store 104. Once an image has been transmitted to the image data store 104, it may become available for viewing and searching by other users of the social network. For example, an individual may have stored images according to "photo albums," and may have shared (allowed access to) the albums with other individuals. In some implementations, a user does not share access to images stored in the data store.

Each image in the image data store 104 is associated with one or more proximity metric values. Proximity metric values are metric values that generally provide information about the associated image and that can be compared to metric values of other images to determine a proximity, e.g., a measure of relatedness, of the image to the other images. The metric values that can be used as proximity metric values can be independent of the image content, and can relate to the time, place, user(s), albums, social-graph and other information related to the image or the user that took the image. Example metrics include the time the image was captured (timestamp), the location where the image was captured (geo-location), the user who uploaded the image to the image data store 104 (user identifier), and a semantic album name generally associated with an image or group of images (album). Other appropriate metrics may be associated with an image, such as the time the image was uploaded to the image data store 104, the user who captured the image, the device used to capture the image, etc.

In some implementations, a user may cause the image data store 104 to not store proximity metric values for one or more images. For example, a user may opt out of having such proximity metric values associated with the images the user uploads. In some implementations, identifiers associated with users (e.g., user account numbers, user identifiers derived from facial recognition techniques, etc.) are anonymized to protect the users privacy.

Proximity metric values may become associated with an image in a variety of ways; for example, they may be stored in metadata associated with an image when it was captured, they may be provided by a user, or they may be provided by a computer or other data processing apparatus. For example, a particular user's camera may include a GPS device, and each image is tagged with GPS coordinates and a time of capture. When the image is uploaded to the image data store, the image is further tagged with such information as a user identifier of a user uploading the image, a photo album identifier, and information for the nodes in a social graph with which the image is associated.

Each image in the image data store 104 is also associated with one or more labels which help identify the content of the image. One example type of a label is a semantic label. A semantic label includes human readable text, and generally is designed to allow a person to identify the content of an image (e.g., "barbeque," or "wedding"). Semantic labels can be processed by a computer to identify the content of an image.

Labels can be associated with images by persons or by a computer that utilizes a computer vision technique. For example, a user can assign to an image a label that the user feels appropriately identifies the content of the image. Likewise, a label may also be associated with an image by the image labeling system 106. For example, the image labeling system 106 may implement one or more computer vision techniques, or may receive data from a separate system, such as a vision-based label system 105 that implements computer vision techniques, to create a label for an image. Such computer vision techniques include optical character recognition (OCR) technology that can be used to identify text (e.g., text from signs, banners, etc.), facial recognition technology that can be used to identify individuals (e.g., names of persons previously identified, or matches of individuals among images), general computer vision technology that can be used to identify particular image content (e.g., distinctive landmarks, such as building; products, such as particular automobiles, soft drinks, and the like; etc.) or other methods or combination of methods for identifying the content of an image. In addition to creating labels for images, the image labeling system 106 adjusts existing sets of labels associated with the images 108.

Each label is associated with a confidence score which is a measure of confidence that the label accurately describes the content depicted in the image. In some implementations, the confidence score is generally a value that falls within a certain range, such as 0 and 1. A confidence score of 0 can indicate the minimum (or no) confidence associated with the label, while a confidence score of 1 can indicate that the label accurately describes the image. Other ranges of values indicating a level of confidence may be used (e.g., 1 and 100, a binary range indicating that the label either matches or does not, a semantic range of values—poor, fair, good, better, best). In some implementations, labels that are added by persons, or that are confirmed by persons, are assigned a default confidence score, e.g., 1, 0.9, or some other value that indicates a relatively high level of confidence.

For labels generated by a computer system, such as the vision based label system 105, the confidence scores vary in proportion to the level of confidence for each label. For example, an image may have the following set of labels and associated confidence scores on a scale from 0 to 1: {"barbeque":0.79, "charcoal grill": 0.72, "football game":0.44, "wedding":0.06}. In this example, "barbeque" has a high confidence score (0.79) relative to the other labels; and "wedding" has a low confidence score (0.06) relative to the other labels.

In some implementations, a label is removed from (or never associated with) the set of labels associated with an image if the confidence score of that label is below a confidence score threshold. For example, if a confidence score threshold is 0.10, the label "wedding" with a confidence score of 0.06 may be removed from the set of labels associated with the image. Removing labels with low confidence scores is designed to ensure that each label associated with an image has a certain measure of confidence that the label accurately describes the content of the image, preventing erroneous label associations.

In some implementations, users of the social network may search for images 108 stored in the image data store 104. For example, a user interested in finding images relating to a summer barbeque might enter the query "summer barbeque" into a search engine, hoping to find images which are related to the query. The search engine can search through the image data store 104 looking for images that have labels related to the search query "summer barbeque," and provide a set of images as a result to the user who entered the query. Searching for images involves reading the labels associated with the images, and in some implementations, the search results may be ranked based on the labels and the confidence scores associated with those labels.

In the example environment 100, the image labeling system 106 accesses the images 108 stored in the image data store 104. Each accessed image is associated with a set of labels and a set of metrics. While the sets associated with a particular image may be empty, each set generally includes at least one value. In some implementations, the image labeling system 106 may choose to access all of the images stored in the image data store 104, or the image labeling system 106 may access only a proper subset of the images 108.

In some implementations, the image labeling system 106 accesses images which meet certain metric value criteria. For example, the image labeling system 106 may access only images which have a timestamp value within a certain range (e.g., between 08/01/2011, 00:00:00 GMT and 08/07/2011, 23:59:59 GMT), and/or within a certain distance (e.g., 1 kilometer). Accessing images based on proximity metric values being within a certain range(s) can limit the number of images to a subset which are more likely to be related to one another, thereby improving accuracy and efficiency. In the example environment 100, the shaded images indicate the images meeting metric value criteria.

The image labeling system 106 selects a first image from the images 108 which were accessed and determines, for every other accessed image, a proximity score which is a measure of how related the other image is to the first image. In some implementations, the proximity score is a value that falls within a certain range; for example, 0 and 1. A proximity score of 0 can indicate the minimum (or no) relation between the other image and the first image, while a proximity score of 1 can indicate that the other image is the same as the first image. Other ranges of values indicating a level of relatedness may be used (e.g., 1 and 100, a binary range indicating that the other image is either related to the first image or not, a semantic range of values—poor, fair, good, better, best).

In some implementations, the proximity score for each other image is determined based on a comparison of the proximity metric values associated with the first image and the corresponding proximity metric values associated with the other image. For example, a first image may have a timestamp of 01/01/2011 and a geo-location for a location New York, N.Y., USA; and the other image may have a timestamp of 01/01/2011 and a geo-location of Boston, Mass. Since the timestamps are closely related, that would likely increase the probability that the images are related. However, the geo-locations are not very closely related (from a distance standpoint), and thus would likely decrease the probability that the images are related. From the proximity metric data, the image labeling system 106 determines a proximity score for the other image.

Other formulas and factors may be taken into account in determining how each proximity metric value affects the proximity score. For example, the proximity score between a first and second image may be determined based on weights given to the relationship between their respective proximity metric values. Thus, if a first and second image each have a timestamp and a geo-location, the proximity score may be based on two weights: one weight based on a comparison of the images' timestamps, and a second weight based on a comparison of the images' geo-locations.

Using the example first and second images above, a weight for the timestamp may be 1.0 because the timestamps are identical (e.g., both are 01/01/2011). A weight for the geo-location may be 0.10 because the geo-locations are quite different (e.g., New York, N.Y. is about 190 miles from Boston, Mass.). In addition, the geo-location of an image may be more significant in the proximity score calculation than the timestamp. Thus, while the timestamps in the above example are identical (and have a weight of 1.0), the geo-location is quite different, and the proximity score for the image may only be 0.15 (on a scale of 0 to 1, with 0 indicating unrelated images, and 1 indicating that the images are the same).

In some implementations, the precision of each proximity metric value may also affect the proximity score. For example, a timestamp which is only as precise as the day (e.g., 01/01/2011) is not as precise as a timestamp which includes hours, minutes, and seconds (e.g., 01/01/2011, 16:41:59 GMT). Thus, if two images have a matching timestamp, a more precise timestamp may increase the relatedness of the images relative to the less precise timestamp. In other words, two images taken on the same day may indicate a certain level of relatedness, but two images taken at the same second/minute/hour of the same day may indicate a higher level relatedness. While the foregoing example relates to the timestamp, the precision of other proximity metric values, such as geographic location, may also affect the proximity score.

The image labeling system 106 adjusts the set of labels associated with the first image based on the respective proximity scores of the other images and the confidence scores of the labels of the other images. In some implementations, the confidence score of a pre-existing label associated with the first image is adjusted. For example, one of the other images may have a proximity score of 0.90 and it may have one label, "barbeque" with a confidence score of 0.80. If the label "barbeque" already exists in the set of labels associated with the first image, the confidence score of that pre-existing label may be adjusted. An example formula for adjusting a confidence score of a pre-existing label can be:

$$P_{11}'=P_{11}+P_{21}*PS_{12}$$

Where $P_{11}'$=adjusted confidence score of the first label of the first image, $P_{11}$=the pre-existing confidence score of the first label of the first image, $P_{21}$=the confidence score of the first label of the other image, and $PS_{12}$=the proximity score for the other image (as it relates to the first image). Given a pre-existing "barbeque" label for the first image with a confidence score of 0.10, the example formula would be resolved as follows:

$$P_{11}'=0.10+0.80*0.90=0.82$$

Thus, in the example given above, the confidence score of the label "barbeque" of the first image is adjusted to 0.82. Using this formula, the confidence score of the "barbeque" label associated with the first image increased because the other image was very highly related to the first image (0.90 proximity score on a scale of 0 to 1 where 1 indicates that the images are the same) and because the "barbeque" label likely described accurately the content depicted in the other image (0.80 confidence score on a scale of 0 to 1 where 1 indicates a maximum confidence that the label describes the content depicted in the image).

In some implementations, the image labeling system 106 adds a label to the set of labels associated with the first image based on the respective proximity scores of the other images and the confidence scores of the labels of the other images. For example, if, in the example given above, the label, "barbeque" did not already exist in the set of labels associated with the first image, the image labeling system may add it to the set of labels associated with the first image. The confidence score for the new label may be equal to the confidence score of that label as it applies to the other image (0.80 in the example above). In some implementations, a formula is used to determine the confidence score to associate with the new label. An example formula can be:

$$P_{11}P_{21}*PS_{12}$$

Where $P_{11}$=the confidence score of the new label being associated with the first image, $P_{21}$=the confidence score of the label of the other image, and $PS_{12}$=the proximity score for the other image (as it relates to the first image). Thus, using the example values and label given above, the "barbeque" label would be added to the set of labels for the first image with a confidence score of 0.72 (0.80*0.90=0.72). The foregoing formulas are example formulas only, and other formulas may be used.

The formula above may be generalized for multiple images having a matching label, e.g., $$P_{li'}=P_{li}+\text{SUM}(P_{lj}*w_j)$$

where:
$P_{li}$=Confidence score of label l for image i;
$P_{li'}$=Final label probability;
J=set of images with a relation to i;
$P_{lj}$=Confidence score for label l being related to image j; and
$w_j$=Proximity score, e.g., based on social/temporal/geo/album-semantic relations, between image i and image j.

Other weight adjustment formulas can also be used. For example, the proximity scores can be adjusted in proportion to the current value of $P_{li}$ so that the final value of $P_{li'}$ asymptotically approaches a maximum confidence score of 1.0; the final value of $P_{li'}$ may be limited to a maximum confidence value, e.g., 0.9; etc.

Figure 2:
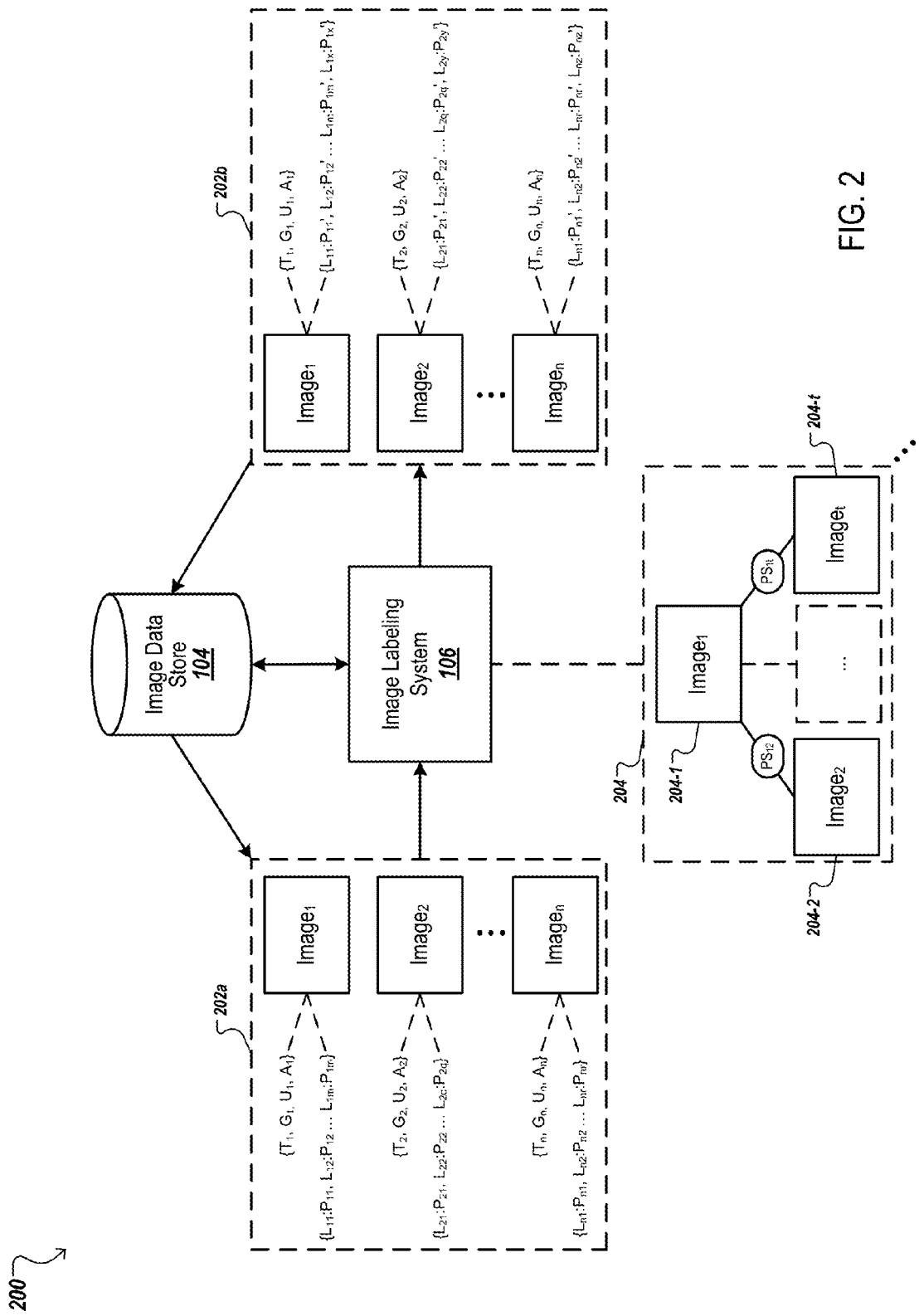
FIG. 2 is an illustration of an example data flow in which image labels are created.

The process for adjusting a set of labels for an image (e.g., adjusting a score for an assigned label and/or adding/removing a label to/from a set of labels) is better understood with reference to FIG. 2, which is an illustration of an example data flow 200 in which image labels are created. The image labeling system 106 can access images 202a stored in an image data store 104. Each image is associated with a set of metrics and a set of labels. In the example data flow 200, an example set of metrics is shown as $\{T_1, G_1, U_1, A_1\}$, where $T_1$ is a proximity metric value which represents a timestamp (the time the image was captured) of $\text{Image}_1$, $G_1$ is a proximity metric value which represents a geographic location ("geo-location," e.g., geographic coordinates or nearest address where the image was captured) associated with $\text{Image}_1$, $U_1$ is a proximity metric value which represents the user who caused transmission of the $\text{Image}_1$ to the image data store 104, and $A_1$ is a proximity metric value which represents an album name (a semantic identifier indicating a group of images to which the image belongs) of $\text{Image}_1$. The example list of proximity metrics is not exhaustive, and other appropriate metrics that can be determined independent of the underlying image content can also be used.

In the example data flow 200, an example set of labels is shown as $\{L_{11}:P_{11}, L_{12}:P_{12} \ldots L_{1m}:P_{1m}\}$, where $L_{11}$ is a label associated with $\text{Image}_1$, and $P_{11}$ is the confidence score (also referred to as a probability) associated with the label, $L_{11}$. An example set of $\{T_1, G_1, U_1, A_1\}$ metrics and labels for $\text{Image}_1$ may be as follows:
Metrics: {08/07/2011 14:59:59 EST, 100 Oak Drive, John Smith, Company Party}
Labels: {"barbeque":0.79, "football game":0.44 . . . "wedding":0.06}

Assuming a confidence score range of 0 to 1, the set of labels for $\text{Image}_1$ indicates that the content of the image is highly related to "barbeque," moderately related to "football game," and only very slightly related to "wedding." For example, a computer vision technique previously applied to $\text{Image}_1$ may have determined that the image contained the following attributes: an outdoor picture with a grill located in the foreground, several people in the picture wearing shirts with professional football team logos, a football in the air, and a large cake on a table. Those example attributes may have resulted in the creation of the set of labels shown above.

The image labeling system 106 selects a first image from the images 202a and determines, for each of the other images of the images 202a, a proximity score from the proximity metrics. The proximity score for each other image indicates how related that other image is to the first image, and, in some implementations, is determined independent of the labels. For example, the image labeling system 106 selects $\text{Image}_1$ and determines, for each other image ($\text{Image}_2$ through $\text{Image}_n$) a proximity score that indicates how related each other image is to $\text{Image}_1$. The image labeling system 106 accesses one or more proximity metric values associated with each of the images 202a and determines the proximity score based on the one or more proximity metric values to form an image graph 204 of images 204-1 . . . 204-t.

To illustrate, the image labeling system 106 accesses the proximity metric values associated with $\text{Image}_1$ 204-1 and $\text{Image}_2$ 204-2 The proximity metric values for $\text{Image}_1$ may be as follows:
Metrics: {08/07/2011 14:59:59 EST, 100 Oak Drive, John Smith, Company Party}
The proximity metric values for $\text{Image}_2$ may be as follows:
Metrics: {08/07/2011 15:30:00 EST, 100 Oak Drive, Jane Doe, Summer Picnic}

The image labeling system 106 compares the proximity metric values associated with each image to determine the proximity score. For example, the timestamps are only 30 minutes and 1 second apart, which may indicate the images are more likely to be related than not. The geo-location is the same address, which also increases the likelihood that the images are related.

The user associated with each image is different, so this might indicate that the images are less likely to be related. However, in some implementations the image labeling system 106 accesses a user's social graph data to determine how closely related the user of $\text{Image}_1$ is to the user of $\text{Image}_2$. Assume that Jane Doe belongs to John Smith's social graph, e.g., is a contact that belongs to a subgroup "co-worker" in the social graph. Accordingly, the image labeling system 106 determines that John Smith and Jane Doe are socially related, and thus the proximity score is adjusted (e.g., increased to indicate a greater likelihood that those images are related). Other factors may be considered in determining the degree of social relation between users. For example, the number of communications between Jane Doe and John Smith over a period of time may be considered. In another example, degrees of separation on a social graph are considered (e.g., Jane Doe might not belong to John Smith's graph, but they have a mutual friend linking them).

The album names associated with the images do not have matching words, so this might indicate that the images are less likely to be related. However, in some implementations, "Party" and "Picnic" may be identified by the image labeling system 106 as synonyms, which might indicate a higher likelihood that the images are related.

Other appropriate methods or formulas may be used by the image labeling system 106 to determine how closely related the proximity metric value of one image is to another, or how the comparison of proximity metric values affects the proximity score. One example formula for determining a proximity score is the average of binary values (0 or 1) given to each of the compared proximity metrics to indicate whether each proximity metric value of the first image matches or is related to the corresponding proximity metric of the other image. Thus, if the timestamp, geo-location and user for each image are related, but the album name is not, the average of binary values would be 0.75 ((1+1+1+0)/4=0.75), which would be the proximity score associated with the other image.

In general, the proximity score formula can be a linear or non-linear formula that takes as input the proximity scores of two images and outputs a proximity score of a first image relative to a second, e.g., $$PS_{nm} = f(PM_{1n}, PM_{1m}; PM_{2n}, PM_{2m} \ldots PM_{qn}, PM_{qm})$$

where:

$PS_{nm}$ is the proximity score on an image n relative to another image m; and $PM_{jk}$ is the proximity metric j for an image k.

In some implementations, proximity scores are symmetric, i.e., $PS_{nm} = PS_{mn}$. In other implementations, the proximity scores can be asymmetric, i.e., $PS_{nm} \neq PS_{mn}$. For example, if a user n has added a user m to a circle for the user n, but the user m has not added the user n to a circle the user m, then $PS_{nm}$ may be greater than $PS_{mn}$, and the user n appears to have a greater interest in the user m that does the user m in user n. In some implementations, for each image that is selected, a corresponding set of images 204 is determined for the selected image. Additionally, the images j=2 . . . t are included in the set 204 only if the proximity score $PS_{ij}$ is greater than a proximity score threshold. For example, while the image data store 104 may include millions of images, the set of images 204 that are selected based on the proximity score threshold may be a relatively small set, e.g., hundreds.

The image labeling system 106 adjusts the set of labels associated with the selected image 204-1 based on the respective proximity scores of the other images 204-2 through 204-t and the confidence scores associated with the labels of the other images 204-2 through 204-t. For example, Image$_1$ might have the following set of labels:

Labels: {"barbeque":0.79, "football game":0.44 "wedding":0.06}

Image$_2$ might have a proximity score of 0.75 and the following set of labels:

{"pool":0.80, "barbeque":0.25 . . . "football game":0.12}

The image labeling system 106 adjusts the set of labels for Image$_1$ 204-1 based on the proximity score (e.g., 0.75) of Image$_2$ 204-2 and its associated set of labels. An example formula for adjusting the confidence score of a label might be as follows:

$$P_{11}' = P_{11} + (P_{22} * PS_{12})$$

Where $P_{11}'$=the adjusted confidence score for $L_{11}$ of Image$_1$, $P_{11}$=the pre-existing confidence score for $L_{11}$ of Image$_1$, $P_{22}$=the confidence score of the label $L_{22}$ corresponding to the label $L_{11}$, and $PS_{12}$=the proximity score associated with Image$_2$ (with respect to Image$_1$). With the example values given above, the confidence score associated with the "barbeque" label for Image$_1$ 204-1 would be adjusted as follows:

$$P_{11}' = 0.79 + (0.25 * 0.75) = 0.79 + 0.30 = 0.98$$

In some implementations, the other image may be associated with a label which is not included in the set of labels associated with the first image. For example, using the above labels, Image$_2$ has a "pool" label which is not included in the set of labels for Image$_1$. In some implementations, the label associated with the other image is added to the set of labels for the first image. Using the above example, the label "pool" from Image$_2$ may be added to the set of labels for Image$_1$.

In some implementations, the confidence score associated with the added label is based on the confidence score of the existing label and the respective proximity score. For example, Image$_2$ has a proximity score of 0.75 (as it relates to Image$_1$), and the confidence score of the "pool" label associated with Image$_2$ is 0.80. An example formula to determine the confidence score for the "pool" label being added to the set of labels for Image$_1$ may be a product of the proximity score and the confidence score. Thus, the confidence score for the label "pool" associated with Image$_1$ would be 0.60 (i.e., 0.75*0.80) using the example formula.

In some implementations, the set of labels associated with the first image is adjusted in response to the confidence score of one or more labels associated with one of the other images being above a confidence score threshold. For example, given a confidence score threshold of 0.50, the labels associated with Image$_2$ 204-2 having a confidence score of 0.50 or greater would be used to adjust the labels of Image$_1$ 204-1. This threshold is designed to reduce "noisy" image labels from propagating among the set of images 204.

In the example data flow 200, the image labeling system 106 produces, for each image in the set of accessed images 202a, an adjusted set of labels. The image labeling system 106 provides adjusted sets of labels for storage in the image data store 104. The adjusted set of labels can be used for subsequent processing (e.g., image searching, etc.).

Figure 3:
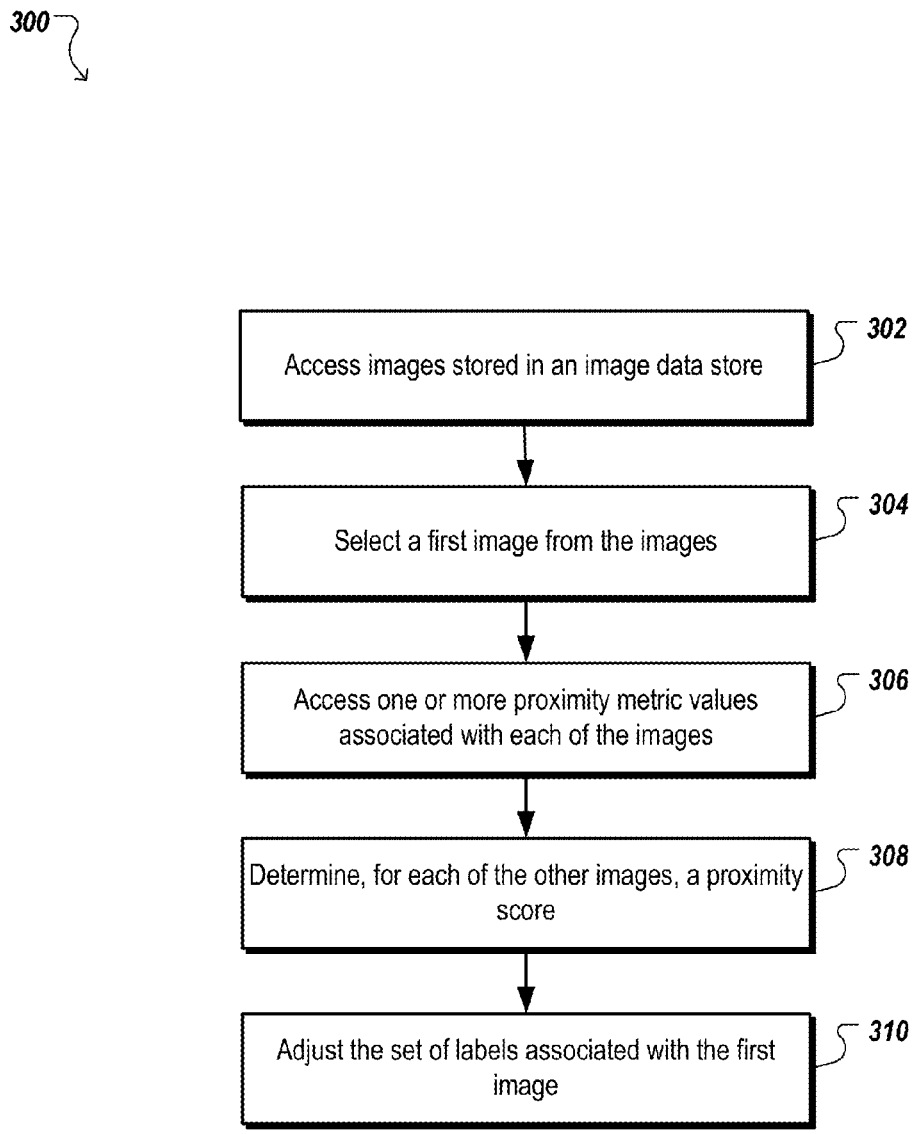
FIG. 3 is a flow chart of an example image labeling process.

FIG. 3 is a flow chart of an example image labeling process 300. The process 300 may be used by a data processing apparatus that is used to realize the image labeling system 106.

Images stored in an image data store are accessed (302). Each of the images is associated with a respective set of labels, and each label describes content depicted in the image. Each label has a respective confidence score that is a measure of confidence that the label accurately describes the content depicted in the image.

A first image from the images is selected (304), and one or more proximity metric values associated with each of the images are accessed (306). In some implementations, the proximity metric values include one or more of a timestamp that represents the time that an image was first recorded, a location that represents the geographic location in which the image was first recorded, an album name that is a semantic identifier associated with the image, and a user identifier associated with the image.

For each of the other images, a proximity score is determined (308). Each proximity score is determined independent of the labels, and is a measure of a relatedness of the respective other image to the first image. In some implementations, each proximity score is determined based on a comparison of the proximity metric values of the first image and the corresponding proximity metric values of the other image. For example, the proximity score for a first image and a second image may be based on a comparison of the timestamp, geo-location, album name, and user associated with each image.

The set of labels associated with the first image is adjusted (310). The adjustment is based on the respective proximity score of the other images and the confidence scores of the labels of the other images. In some implementations, one or more confidence scores of the labels associated with the first image are adjusted based on a product of the confidence score for the label for the other image and the proximity score.

In some implementations, a new label can be added to the set of labels associated with the first image if the product of the confidence score of the label for the other image and the proximity score meets a threshold confidence level, e.g., 0.70. For example, a first image may have a set of labels that does not include the label "wedding." The "wedding" label may be added to the set of labels associated with the first image based on a second image having a proximity score of 0.80 and a confidence score of 0.90 associated with the label "wedding."

In some implementations, thresholds for the proximity scores and confidence scores are used to reduce the likelihood that labels lacking confidence or unrelated images are used to adjust a set of labels. Adjustment of the set of labels associated with the first image according to these thresholds is further defined by the process described below with reference to FIG. 4.

Figure 4:
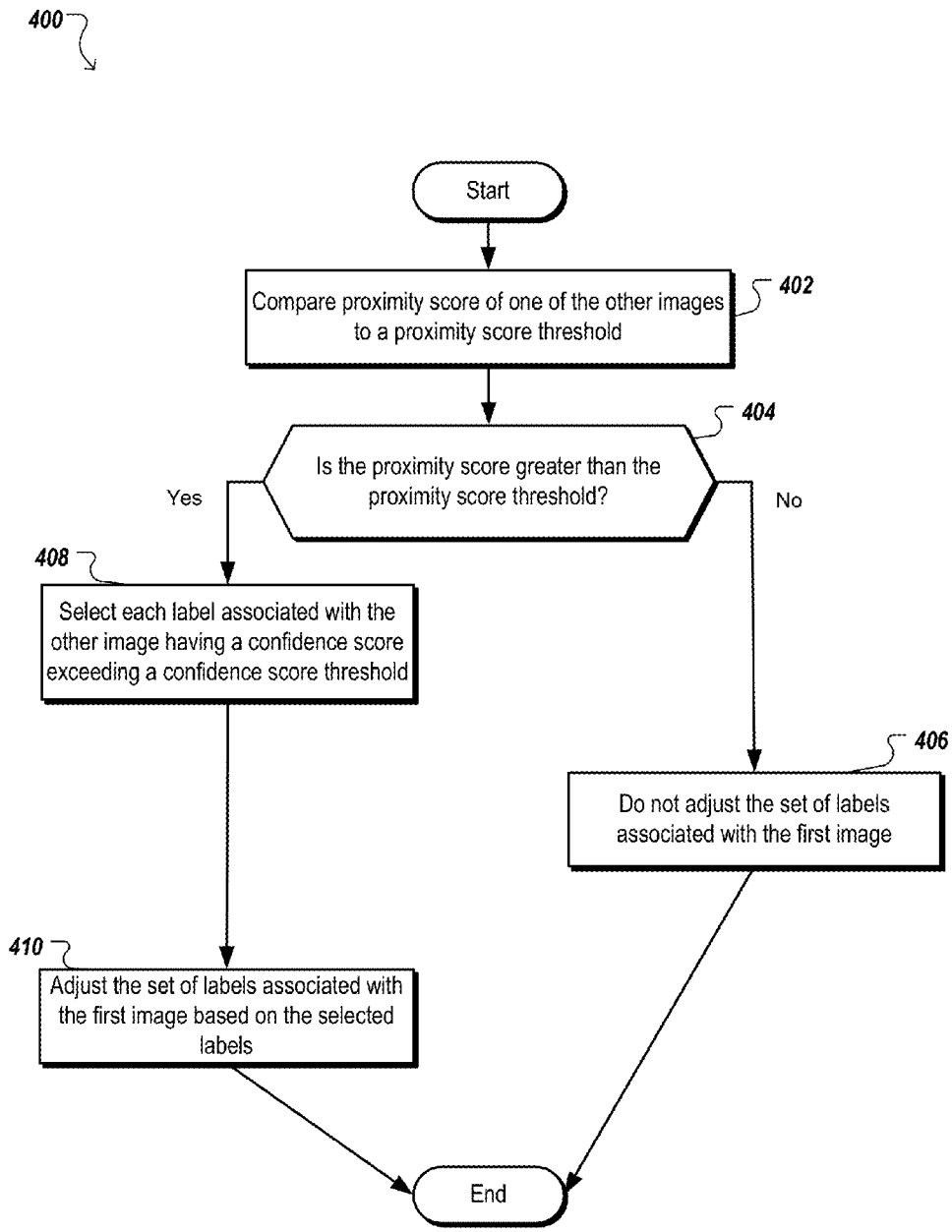
FIG. 4 is a flow diagram of an example process for adjusting a set of labels.

FIG. 4 is a flow diagram of an example process 400 for adjusting a set of labels. The process 400 may be used by a data processing apparatus that is used to realize the image labeling system 106. In particular, the process 400 is used to select which other images to used when adjusting labels for a first image, and for each of those other images, which labels to use for the adjustment.

The proximity score of one of the other images is compared to a proximity score threshold (402). If it is determined in step 404 that the proximity score of the other image is greater than the proximity score threshold, the process continues to step 408, otherwise the process continues to step 406. In step 406, the set of labels associated with the first image is not adjusted based on the selected other image, and the process 400 ends (or, alternatively, selects another image if another image remains to be processed).

If the proximity score is greater than the threshold, then each label associated with the other image having a confidence score exceeding a confidence score threshold is selected (408). The set of labels associated with the first image is adjusted based on the selected labels (410), and the process ends (or, alternatively, selects another image if another image remains to be processed). In some implementations, the set of labels associated with the first image is adjusted based on, for each label of each other image having a confidence score greater than the confidence score threshold, a product of the respective proximity score of the other image and the respective confidence score of the label of the other image.

For example, a confidence score threshold may be 0.75. A second image may have a proximity score of 0.50 as it relates to a first image (assume this is greater than the proximity score threshold) and have a set of labels as follows: {"barbeque":0.90, "football game":0.80, "pool":0.70}. Because the second image has two labels with confidence scores greater than 0.75, the set of labels associated with the first image is adjusted twice (once for each label greater than the threshold). One adjustment is based on the value 0.45–the product of the proximity score of the second image (0.50) and the confidence score of the label "barbeque" (0.90). The second adjustment is based on the value 0.40–the product of the proximity score of the second image (0.50) and the confidence score of the label "football game" (0.80).

Figure 5:
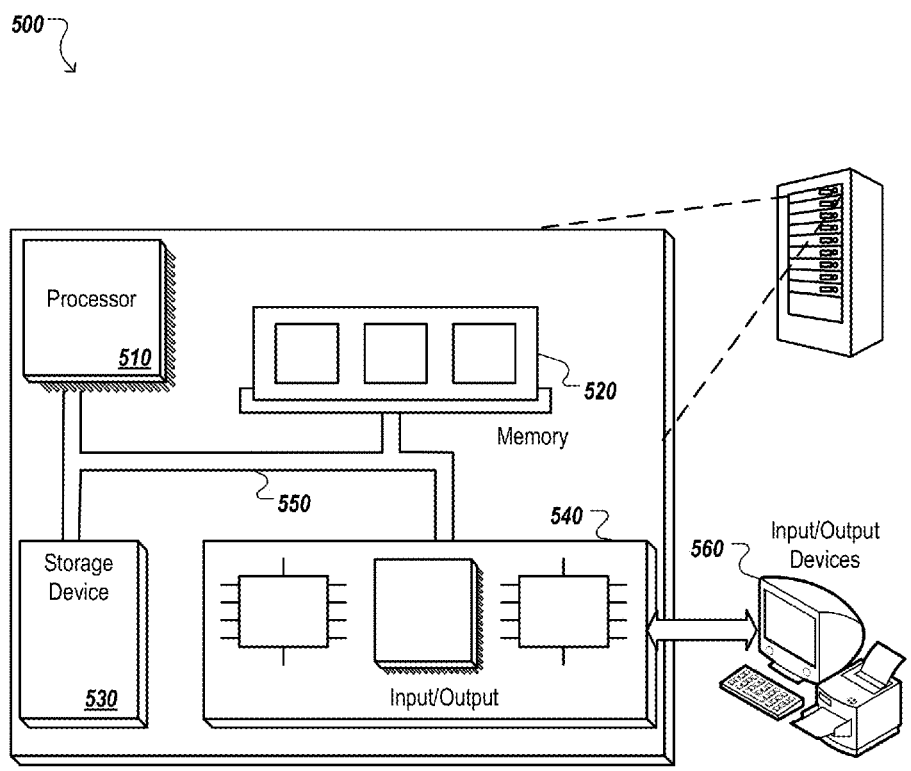
FIG. 5 is a block diagram of an example data processing apparatus.

FIG. 5 is a block diagram of an example data processing apparatus 500 that can be used to perform operations described above. The apparatus 500 includes a processor 510, a memory 520, a storage device 530, and an input/output device 540. Each of the components 510, 520, 530, and 540 can be interconnected, for example, using a system bus 550.

The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the apparatus 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the apparatus 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the apparatus 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example data processing apparatus has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    accessing, by the data processing apparatus, images stored in an image data store, the images being associated with respective sets of labels, each label describing content depicted in an image and having a respective confidence score that is a measure of confidence that the label accurately describes the content depicted in the image;
    accessing, by the data processing apparatus, one or more proximity metric values associated with a first image of the images;
    accessing, by the data processing apparatus, one or more proximity metric values associated with a second image of the images;
    determining, by the data processing apparatus, a proximity score for the second image based on a comparison of the proximity metric values of the first image and corresponding proximity metric values of the second image, the proximity score being a measure of a relatedness of the second image to the first image;
    identifying, by the data processing apparatus, a second label associated with the second image, the second label having a second confidence score that is a measure of confidence that the second label accurately describes the content depicted in the second image; and
    generating, by the data processing apparatus, a first label for the first image based on the second label, the proximity score for the second image, and the second confidence score for the second label; and
    determining, for the first label, a first confidence score based on the proximity score for the second image and the second confidence score for the second label, the first confidence score being a measure of confidence that the first label accurately describes the content depicted in the first image.

2. The method of claim 1, wherein accessing the images is based on at least one of the one or more proximity metric values associated with the images being within a predetermined range.

3. The method of claim 1, wherein the one or more proximity metric values include a timestamp that represents the time that the image was first recorded.

4. The method of claim 3, wherein determining the proximity score for the second image comprises determining the proximity score based on a difference between the timestamp of the first image and the timestamp of the second image.

5. The method of claim 1, wherein the one or more proximity metric values include a location that represents the geographic location in which the image was first recorded.

6. The method of claim 5, wherein determining the proximity score for the second image comprises determining the proximity score based on a distance between the location of the first image and the location of the second image.

7. The method of claim 1, wherein the one or more proximity metric values include an album name that is a semantic identifier of the image.

8. The method of claim 7, wherein determining the proximity score for the second image comprises determining the proximity score based on a similarity between the album name of the first image and the album name of the second image.

9. The method of claim 1, wherein the one or more proximity metric values include a user associated with the image.

10. The method of claim 9, wherein determining the proximity score for the second image comprises determining the proximity score based on a measure of relatedness between the user associated with the first image and the user associated with the second image.

11. The method of claim 1, wherein the first label is the same as the second label.

12. The method of claim 1, wherein determining the proximity score for the second image comprises determining the proximity score independent of the content depicted in the second image.

13. The method of claim 1, wherein the first label is generated in response to the proximity score of the second image being above a proximity score threshold and a confidence score of the second label of the second image being above a confidence score threshold.

14. The method of claim 1, wherein the first confidence score is a product of the proximity score of the second image and the confidence score of the second label.

15. A system, comprising:
    a data processing apparatus;
    a data store storing instructions executable by the data processing apparatus and upon execution by the data processing apparatus cause the data processing apparatus to perform operations comprising:
    accessing, by the data processing apparatus, images stored in an image data store, the images being associated with respective sets of labels, each label describing content depicted in an image and having a respective confidence score that is a measure of confidence that the label accurately describes the content depicted in the image;
    accessing, by the data processing apparatus, one or more proximity metric values associated with a first image of the images;
    accessing, by the data processing apparatus, one or more proximity metric values associated with a second image of the images;
    determining, by the data processing apparatus, a proximity score for the second image based on a comparison of the proximity metric values of the first image and corresponding proximity metric values of the second image, the proximity score being a measure of a relatedness of the second image to the first image; and
    identifying, by the data processing apparatus, a second label associated with the second image, the second label having a second confidence score that is a measure of confidence that the second label accurately describes the content depicted in the second image;
    generating, by the data processing apparatus, a first label for the first image based on the second label, the proximity score for the second image, and the second confidence score for the second label; and
    determining, by the data processing apparatus and for the first label, a first confidence score based on the proximity score for the second image and the second confidence score for the second label, the first confidence score being a measure of confidence that the first label accurately describes the content depicted in the first image.

16. The system of claim 15, wherein determining the proximity score for the second image comprises determining the proximity score independent of the content depicted in the second image.

17. The system of claim 15, wherein the first label is generated in response to the proximity score of the second image being above a proximity score threshold and a confidence score of the second label of the second image being above a confidence score threshold.

18. A computer storage device encoded with a computer program, the program comprising instructions that when executed by data processing apparatus cause the data processing apparatus to perform operations comprising:

accessing, by the data processing apparatus, images stored in an image data store, the images being associated with respective sets of labels, each label describing content depicted in an image and having a respective confidence score that is a measure of confidence that the label accurately describes the content depicted in the image;

accessing, by the data processing apparatus, one or more proximity metric values associated with a first image of the images;

accessing, by the data processing apparatus, one or more proximity metric values associated with a second image of the images;

determining, by the data processing apparatus, a proximity score for the second image based on a comparison of the proximity metric values of the first image and corresponding proximity metric values of the second image, the proximity score being a measure of a relatedness of the second image to the first image; and identifying, by the data processing apparatus, a second label associated with the second image, the second label having a second confidence score that is a measure of confidence that the second label accurately describes the content depicted in the second image;

generating, by the data processing apparatus, a first label for the first image based on the second label, the proximity score for the second image, and the second confidence score for the second label; and determining, by the data processing apparatus and for the first label, a first confidence score based on the proximity score for the second image and the second confidence score for the second label, the first confidence score being a measure of confidence that the first label accurately describes the content depicted in the first image.

19. The computer storage device of claim 18, wherein determining the proximity score for the second image comprises determining the proximity score independent of the content depicted in the second image.

20. The computer storage device of claim 18, wherein the first label is generated in response to the proximity score of the second image being above a proximity score threshold and a confidence score of the second label of the second image being above a confidence score threshold.

* * * * *